(12) United States Patent
Fujii et al.

(10) Patent No.: US 10,133,160 B2
(45) Date of Patent: Nov. 20, 2018

(54) PROJECTOR UNIT FOR PORTABLE INFORMATION DEVICES

(71) Applicant: LENOVO (SINGAPORE) PTE. LTD., Singapore (SG)

(72) Inventors: Kazuo Fujii, Kanagawa-Ken (JP); Eiji Shinohara, Kanagawa-Ken (JP); Hideaki Hasegawa, Tokyo-To (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 15/374,612

(22) Filed: Dec. 9, 2016

(65) Prior Publication Data
US 2017/0168377 A1 Jun. 15, 2017

(30) Foreign Application Priority Data
Dec. 11, 2015 (JP) .................................. 2015-242299

(51) Int. Cl.
*G03B 21/14* (2006.01)
*H04N 9/31* (2006.01)
*G03B 29/00* (2006.01)

(52) U.S. Cl.
CPC ......... *G03B 21/145* (2013.01); *G03B 21/142* (2013.01); *G03B 29/00* (2013.01); *H04N 9/3173* (2013.01)

(58) Field of Classification Search
CPC ...... G03B 21/30; G03B 21/14; G03B 21/145; H04N 9/3173; H04N 9/3176; H04N 9/31

USPC ................................................... 353/119, 122
See application file for complete search history.

(56) References Cited

U.S. PATENT DOCUMENTS

| | | | |
|---|---|---|---|
| 8,342,699 B2* | 1/2013 | An ........................ | G06F 1/1626 345/156 |
| 2007/0177115 A1* | 8/2007 | Yin ........................ | G03B 21/30 353/122 |
| 2011/0181846 A1* | 7/2011 | Ozawa ................... | G03B 21/14 353/70 |
| 2014/0016295 A1 | 1/2014 | Huang et al. | |
| 2014/0118708 A1 | 5/2014 | Kadotani et al. | |
| 2015/0022452 A1* | 1/2015 | Zhu ........................ | G03B 29/00 345/168 |

FOREIGN PATENT DOCUMENTS

| | | |
|---|---|---|
| CN | 101009980 A | 8/2007 |
| CN | 102364394 A | 2/2012 |
| CN | 204633036 U | 9/2015 |
| JP | 2005-148556 | 6/2005 |

(Continued)

*Primary Examiner* — Ryan Howard
(74) *Attorney, Agent, or Firm* — Antony P. Ng; Russell Ng PLLC

(57) ABSTRACT

A portable information device having a projector unit is disclosed. The projector unit includes a chassis, a connection terminal part and a projector part. The chassis includes an attachment part removably attached to an attachment target part disposed on a side surface of the portable information device. The connection terminal part is electrically connected to a terminal of the portable information device when the attachment part is attached to the attachment target part. The projector part is rotatably attached to the chassis so that a direction of projection from a projector lens can be changed.

18 Claims, 10 Drawing Sheets

(56) References Cited

FOREIGN PATENT DOCUMENTS

| | | |
|---|---|---|
| JP | 2012-118399 | 6/2012 |
| JP | 2013-239051 | 11/2013 |
| WO | 03069901 A1 | 8/2003 |

* cited by examiner

PROJECTOR UNIT FOR PORTABLE INFORMATION DEVICES

PRIORITY CLAIM

The present application claims benefit of priority under 35 U.S.C. §§ 120, 365 to the previously filed Japanese Patent Application No. JP2015-242299 with a priority date of Dec. 11, 2015, which is incorporated by reference herein.

TECHNICAL FIELD

The present invention relates to portable information devices in general, and in particular to a projector removably attached to a portable information device.

BACKGROUND

Portable information devices, such as laptop personal computers (laptop PCs) and tablet personal computers (tablet PCs), typically have relatively small displays. Thus, an external projector is commonly used for presentation in conjunction with a portable information device. But since external projectors have poor portability, they are used only in limited places and conditions.

As one solution, a projector can be mounted on the rear surface of a laptop PC. For example, a projector can be integrally mounted on the laptop PC. But with this configuration, the projection direction of a video image or an image from a projector lens of the projector is limited to one direction. Thus, to move the projection direction vertically, for example, or to focus on a screen, the laptop PC itself needs to be moved, which requires time and effort.

A projector can also be removably attached to the laptop PC. The projector is attached, in place of a display, to a portion of the body of the laptop PC from which the display is detached. The problem is that, when using the projector, a user cannot watch the display of the laptop PC, which is relatively inconvenient for the user. In addition, the laptop PC equipped with the display cannot be carried together with the projector.

Consequently, it would be desirable to provide an improved configuration for a portable information device and a projector.

SUMMARY

In accordance with an embodiment of the present disclosure, a projector includes a chassis, a connection terminal part and a projector part. The chassis includes an attachment part removably attached to an attachment target part disposed on a side surface of a portable information device. The connection terminal part is electrically connected to a terminal of the portable information device when the attachment part is attached to the attachment target part. The projector part is rotatably attached to the chassis so that a direction of projection from a projector lens can be changed.

With the above-mentioned configuration, the rotation position of the projector part can be adjusted when the projector unit is being attached to the portable information device. The projection direction of projected light from the projector lens can be moved vertically so that the task of focusing an image on a screen can be easily performed. In addition, since the projector unit is attached to the side surface of the portable information device, it is possible to project light on the screen while watching and operating the display of the portable information device. Furthermore, since the projector unit is removably attached to the side surface of the portable information device, the projector unit can easily be detached when not needed.

All features and advantages of the present disclosure will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION

Figure 1:
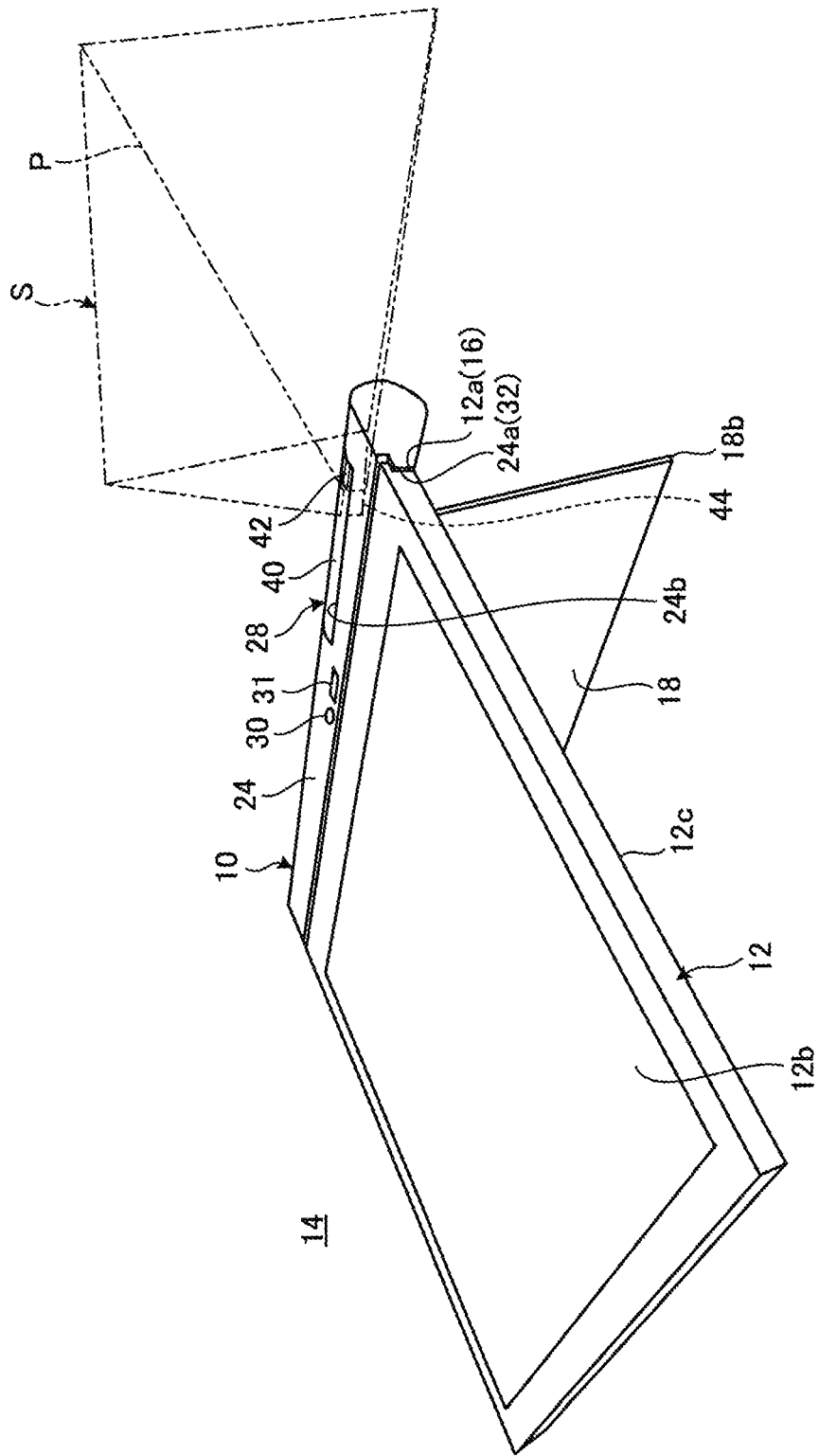
FIG. 1 is a perspective view of an electronic device that includes a tablet PC and a projector unit attached thereto.
Figure 2:
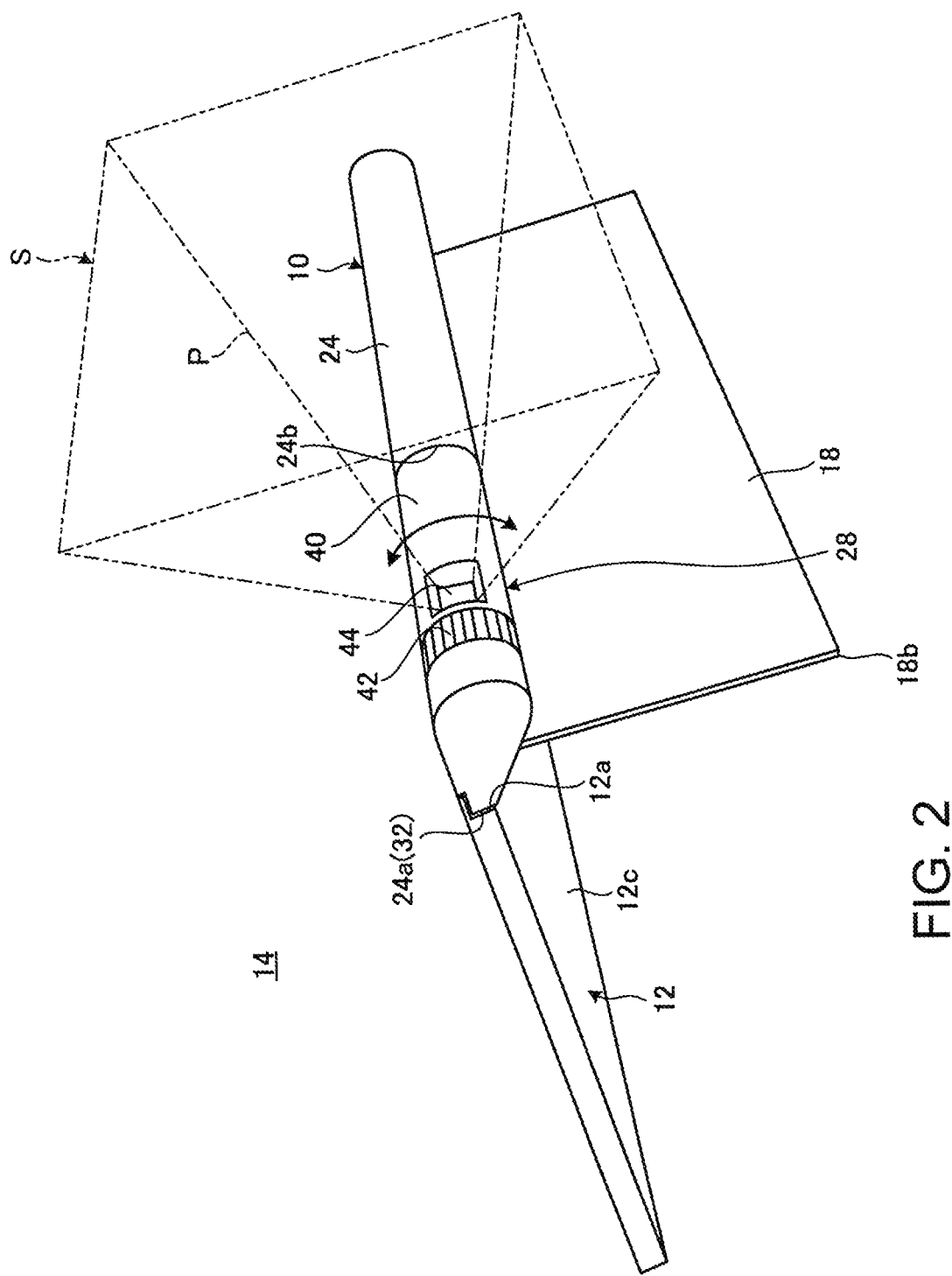
FIG. 2 is a perspective view of the electronic device from FIG. 1 when viewed from the front of the electronic device.
Figure 3:
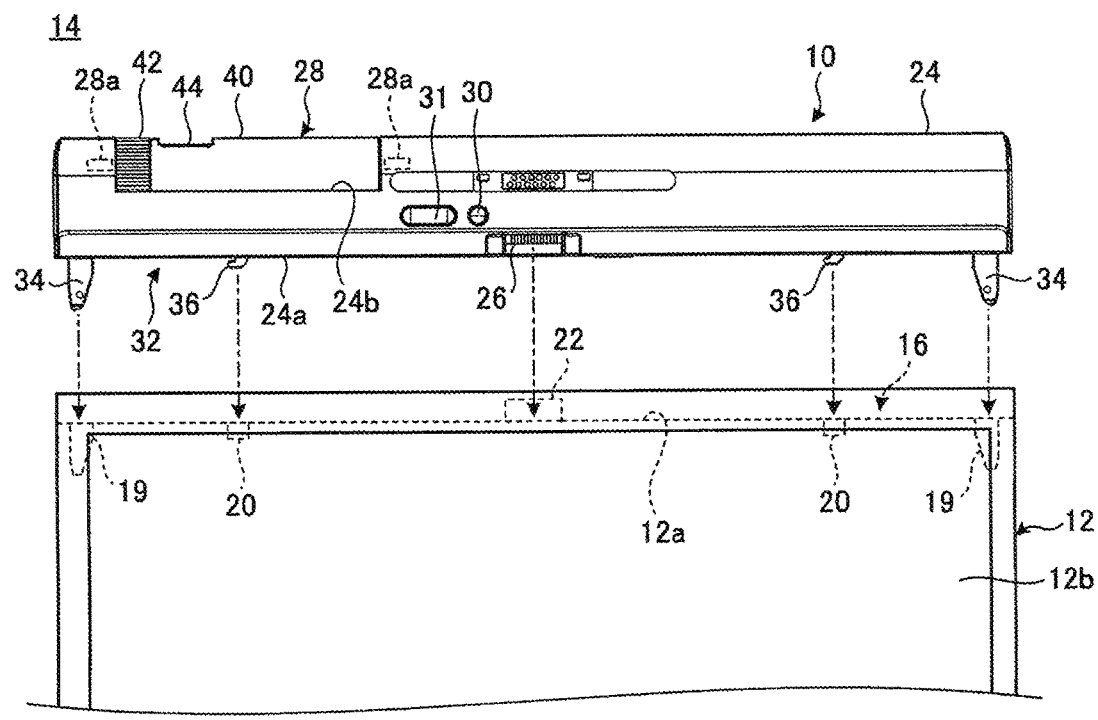
FIG. 3 is a top view of the projector unit that is being detached from the tablet PC.
Figure 4:
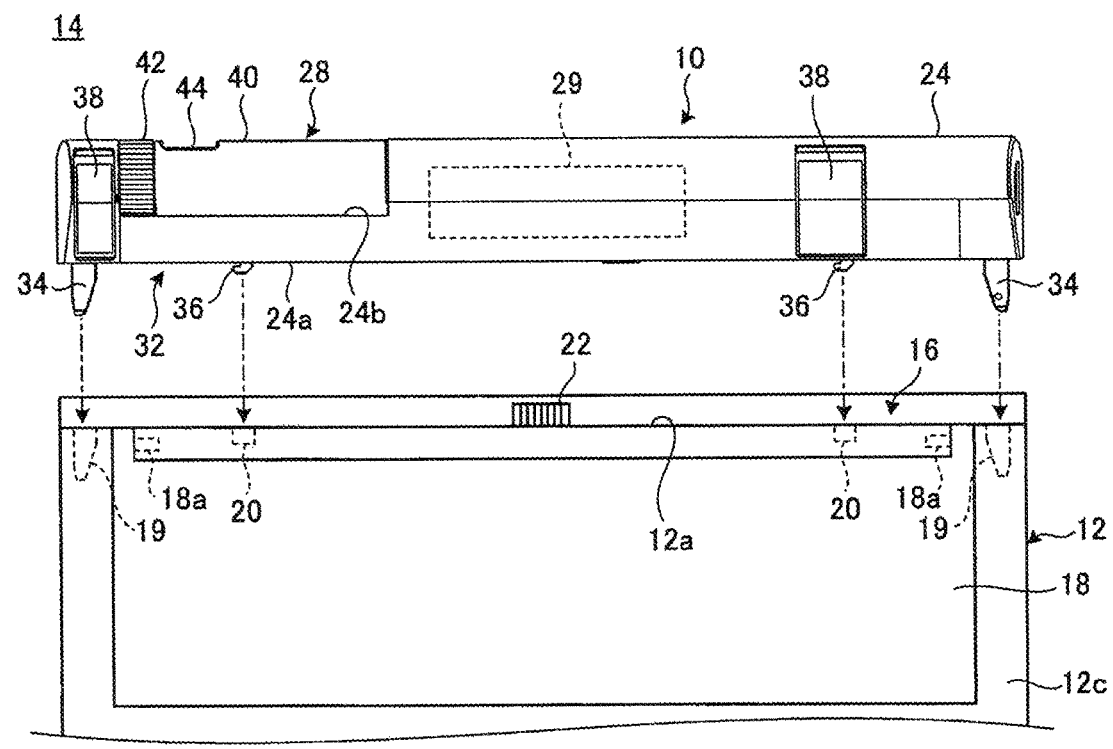
FIG. 4 is a bottom view of the projector unit that is being detached from the tablet PC.

FIG. 1 is a perspective view of an electronic device 14 that includes a projector unit 10 attached to a tablet PC 12, when viewed from the rear of the electronic device 14. FIG. 2 is a perspective view of the electronic device 14 illustrated in FIG. 1 when viewed from the front of the electronic device 14. FIG. 3 is a top view of the projector unit 10 being detached from the tablet PC 12. FIG. 4 is a bottom view of the projector unit 10 being detached from the tablet PC 12.

The projector unit 10 according to this embodiment is a projector device configured to be attached to a side surface 12a of the tablet PC 12 and to display projected light P of, for example, a video image or an image on a screen S. The projector unit 10 may be attached to a portable information device except the tablet PC 12, such as a laptop PC or a smart phone.

As illustrated in FIGS. 1-2, the tablet PC 12 includes a display 12b of a liquid crystal display part of a touch panel type. The tablet PC 12 houses electronic components (not shown) such as a substrate, a computation device, and a memory therein. The side surface 12a of the tablet PC 12 is provided with an attachment target part 16 to which the projector unit 10 is attached (see FIGS. 3 and 4). The attachment target part 16 includes a pair of positioning holes 19, 19 disposed at the left and right ends of the tablet PC 12, and a pair of engaging holes 20, 20 "sandwiched" between the left and right positioning holes 19, 19. A terminal 22 that is a connector projects from a center of the side surface 12a.

The tablet PC 12 includes a stand 18 on a rear surface 12c thereof that is a back surface opposite to the display 12b (see FIGS. 1, 2 and 4). The stand 18 is a rectangular plate that can rotate about rotation shafts 18a disposed near the side surface 12a and having an axial direction extending along the side surface 12a. The stand 18 projects substantially perpendicularly to the rear surface 12c by rotating an open end 18b by approximately 90 degrees about the rotation shafts 18a in a direction away from the rear surface 12c, and serves as a stand configured to hold the tablet PC 12 at a desired raised position.

When the stand 18 is rotated by approximately 90 degrees with the projector unit 10 not attached the tablet PC 12, the tablet PC 12 can be held at a raised position in which the side surface 12a and the open end 18b stand on a mount surface. On the other hand, when the stand 18 is rotated by approximately 90 degrees with the projector unit 10 attached or not attached to the tablet PC 12, the tablet PC 12 can be held at a raised position in which a side surface opposite to the side surface 12a and the open end 18b stand on the mount surface as illustrated in FIGS. 1 and 2.

As illustrated in FIGS. 1-4, the projector unit 10 includes a chassis 24, a connection terminal part 26 (see FIG. 3) disposed on the outer surface of the chassis 24, and a projector part 28 rotatably attached to the chassis 24.

The chassis 24 has a narrowing shape that becomes narrower in a side portion, and has a rod shape having substantially a drop shape in cross section and extending along the side surface 12a of the tablet PC 12. A longitudinal dimension of the chassis 24 is approximately equal to a width of the side surface 12a of the tablet PC 12. The chassis 24 houses electronic components (not shown) such as a substrate and a computation device and a battery device 29 (see FIG. 4) therein. An upper surface of the chassis 24 is provided with a startup button 30 of the projector unit 10 and an adjustment button 31. The adjustment button 31 is a button for adjusting a projected video image, such as a trapezoid correction button.

Although the projector unit 10 may use a power supply of the tablet PC 12 without using the battery device 29, when the battery device 29 is provided, power consumption of a battery device (not shown) of the tablet PC 12 can be reduced.

A side surface 24a at the tip of the narrowing shape of the chassis 24 is provided with an attachment part 32 that is removably attached to the attachment target part 16 of the tablet PC 12. The attachment part 32 includes a pair of positioning projections 34, 34 to be inserted into the positioning holes 19 of the tablet PC 12, and a pair of engaging hooks 36, 36 to be engaged with the engaging holes 20. A pair of left and right attachment levers 38, 38 is rotatably provided on a lower surface of the chassis 24. Each of the attachment levers 38 is used for operating a closest one of the engaging hooks 36. An end surface of the chassis 24 is provided with a connector 39 conforming to a predetermined connection standard such as an HDMI or an USB.

The connection terminal part 26 is disposed at the center of the side surface 24a of the chassis 24. The connection terminal part 26 is a connector that is electrically connected to the terminal 22 of the tablet PC 12. When the connection terminal part 26 is connected to the terminal 22, an output of, for example, a video image from the tablet PC 12 can be projected on the screen S from the projector unit 10.

The projector part 28 is disposed in a recess 24b formed by cutting out an outer surface of the chassis 24 so that the projector part 28 constitutes a part of the outer shape of the chassis 24. The projector part 28 is disposed on a side surface of the chassis 24 opposite to the side surface 24a provided with the attachment part 32. The projector part 28 includes a cylindrical chassis 40 pivotally supported on the chassis 24 by a rotation shaft 28a (see FIG. 3) extending along the longitudinal direction of the chassis 24. An operating dial 42 for manually rotating the cylindrical chassis 40 is provided on an outer peripheral surface of an end portion of the cylindrical chassis 40, and a projector lens 44 is provided at a side of the operating dial 42.

The projector lens 44 is a light projection part that is disposed on the outer surface of the cylindrical chassis 40 and projects, toward the outside screen S, projected light P that was applied from an unillustrated light source disposed in the cylindrical chassis 40 and that has passed through a light source element and a modulation element. Such an internal configuration of the projector part 28 may be similar to that of a known projector device.

Figure 5A:
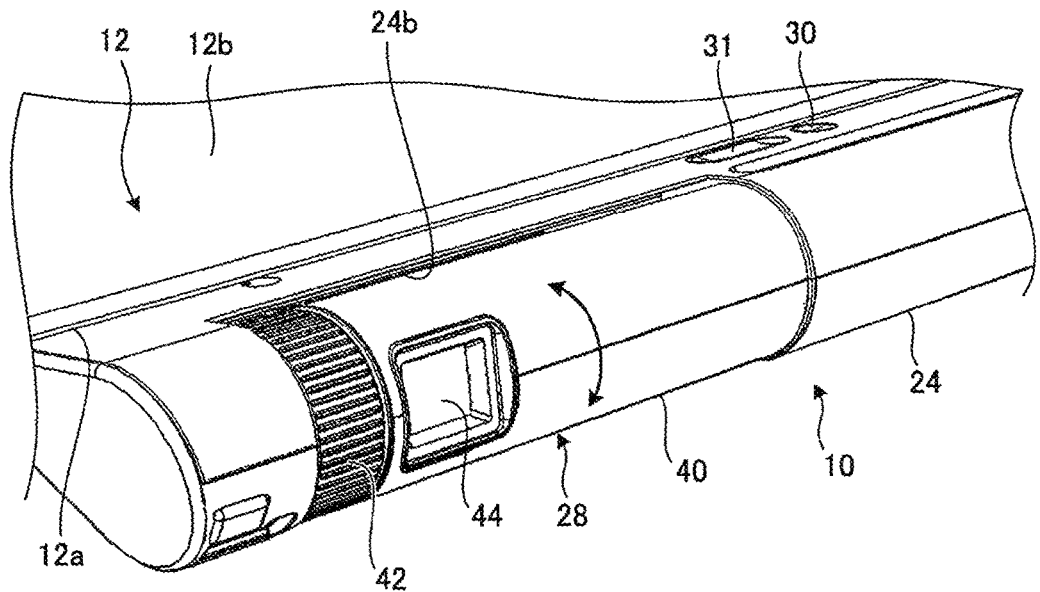
FIG. 5A illustrates a state in which, a projector lens faces outward.
Figure 5B:
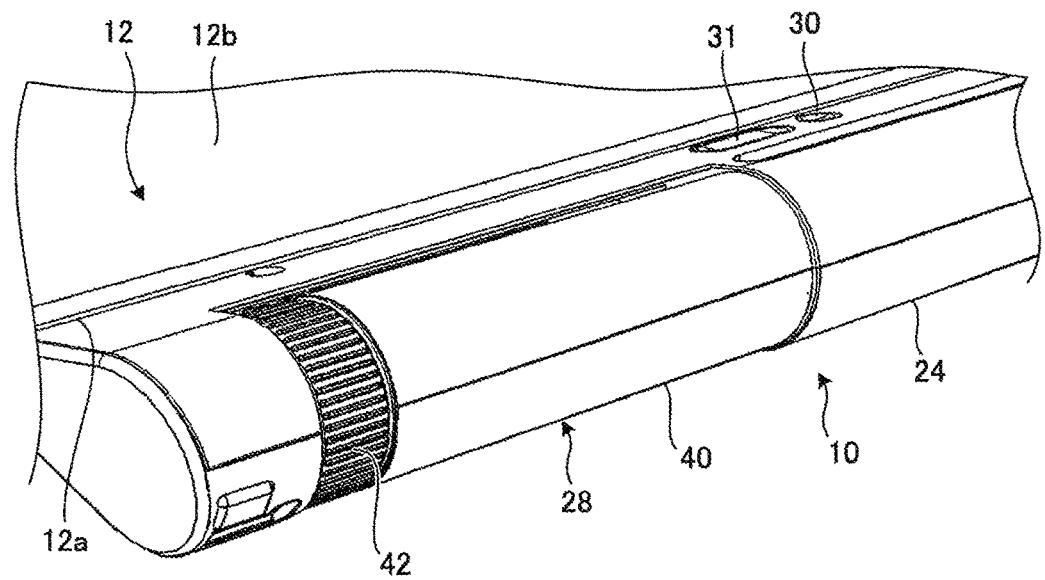
FIG. 5B illustrates a state in which the projector lens is housed in a recess of a chassis.

FIGS. 5A-5B are enlarged perspective views of a portion around the projector part 28. Specifically, FIG. 5A illustrates a state in which the projector lens 44 faces outward, and FIG. 5B illustrates a state in which the projector lens 44 is housed in the recess 24b of the chassis 24.

The projector part 28 is rotatably attached to the chassis 24 as described above. The rotation angle range of the projector part 28 is set at a degree greater than or equal to 180 degrees from a direction in which the projector lens 44 of the cylindrical chassis 40 faces to the front to a direction in which the projector lens 44 faces to the rear as illustrated in at least FIGS. 2 and 5A. Thus, the projection direction of the projected light P from the projector lens 44 can be changed by changing the angle position of the cylindrical chassis 40 through operation of the operating dial 42 as indicated by arrows in FIGS. 2 and 5A. In addition, when the cylindrical chassis 40 is reversely rotated by 180 degrees from the angle position illustrated in FIG. 5A to the position illustrated in FIG. 5B, the projector lens 44 can be housed in the recess 24b of the chassis 24 so that a lens cover can be omitted.

An attachment structure and an operation of the projector unit 10 to the tablet PC 12 as described above will now be specifically described.

Figure 6:
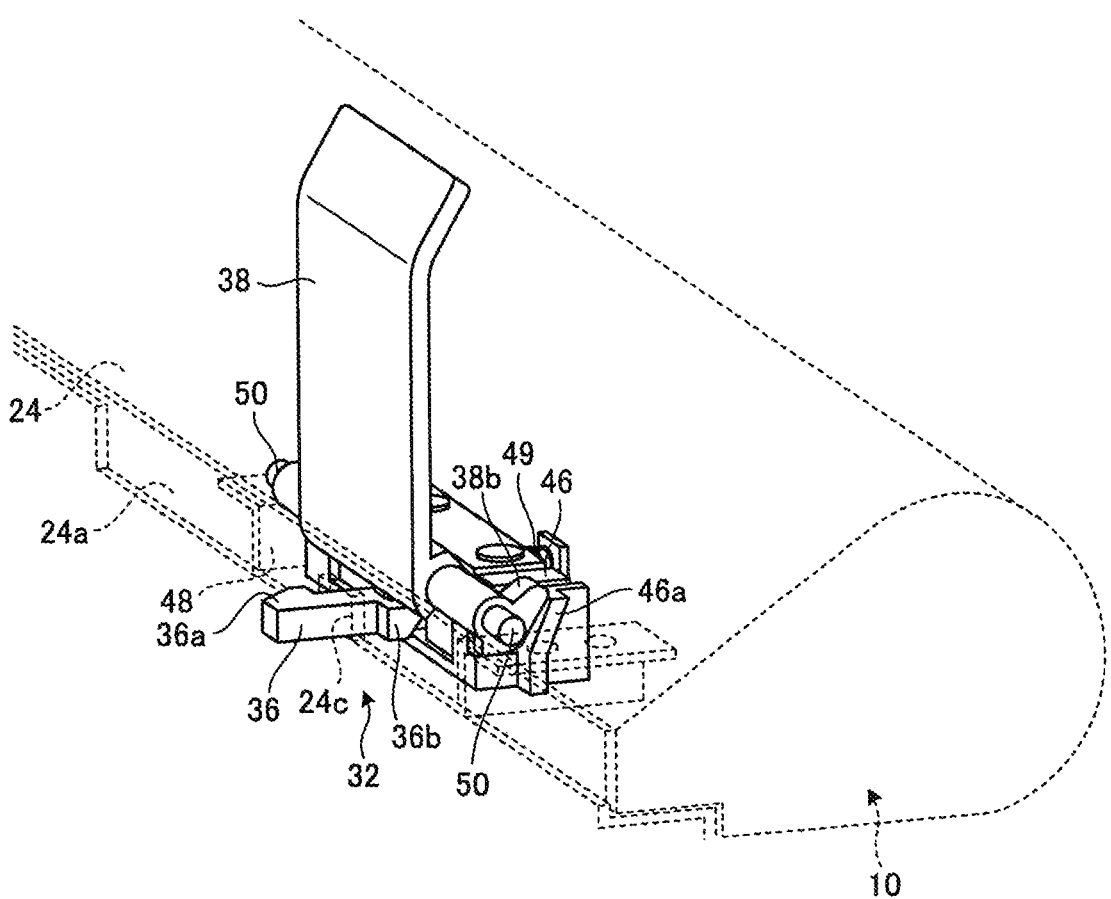
FIG. 6 is a perspective view of an attachment lever of the projector unit.
Figure 7:
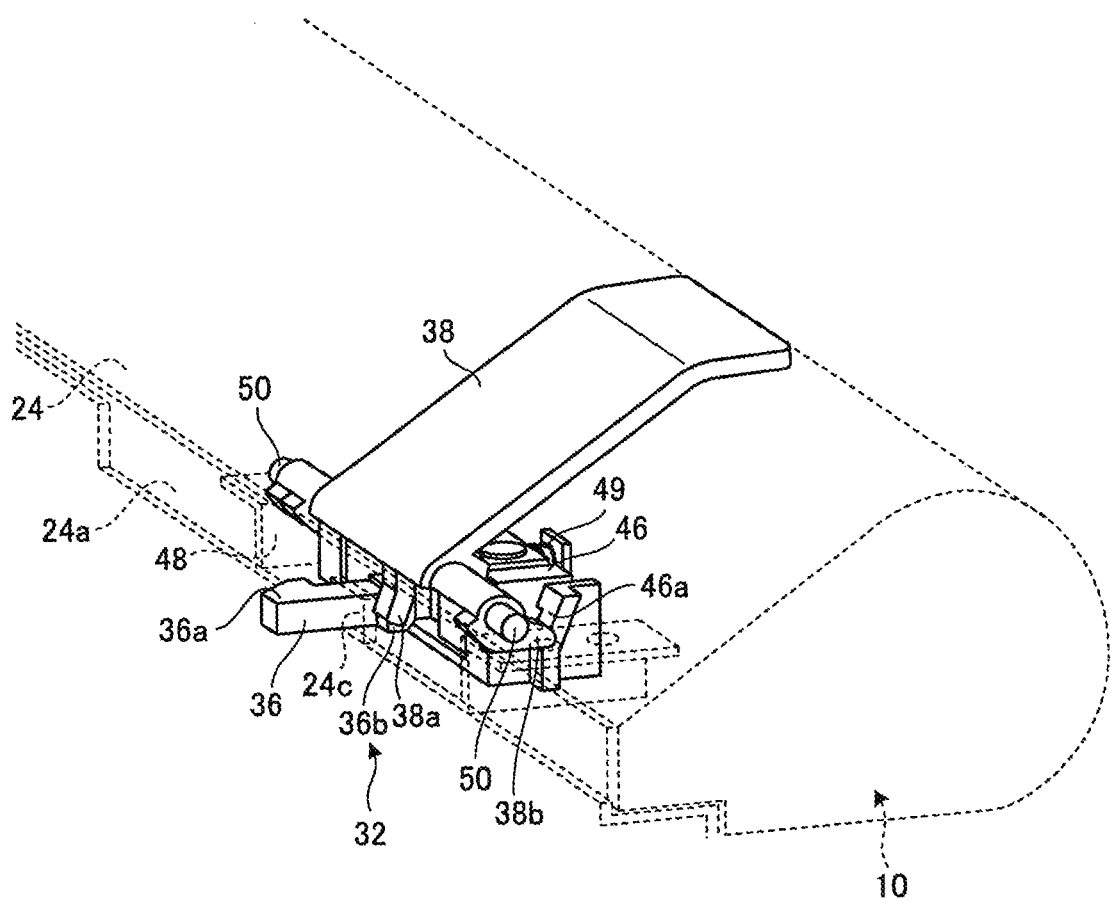
FIG. 7 is a perspective view of an attachment lever that is lowered from the state illustrated in FIG. 6.
Figure 8A:
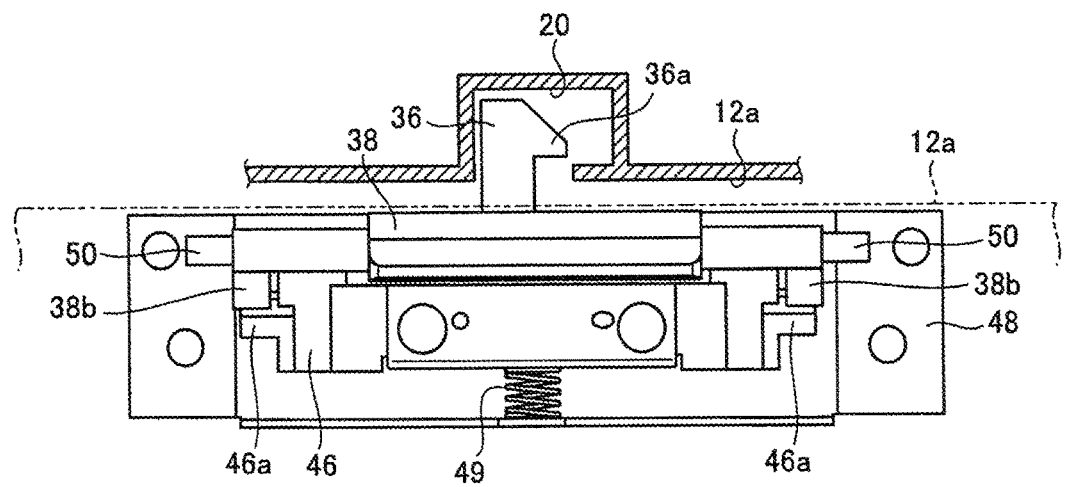
FIG. 8A is a sectional plan view illustrating a state in which the engaging hook is inserted into the engaging hole.
Figure 8B:
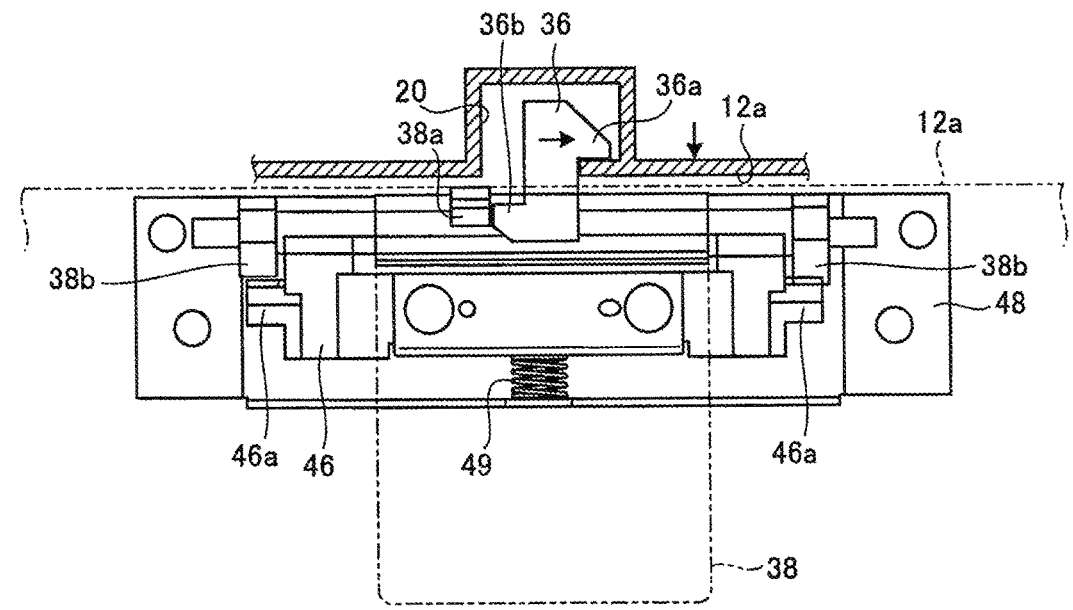
FIG. 8B is a sectional plan view illustrating a state in which the attachment lever is operated to fall from the state illustrated in FIG. 8A so that the engaging hook is engaged with the engaging hole.

FIG. 6 is a perspective illustration of the attachment part 32 of the projector unit 10, and illustrates a state in which the attachment lever 38 is raised. FIG. 7 is a perspective illustration of a state in which the attachment lever 38 falls from the state illustrated in FIG. 6. FIGS. 8A-8B are sectional plan views illustrating an operation of engaging the engaging hook 36 of the projector unit 10 with the engaging hole 20 of the tablet PC 12. Specifically, FIG. 8A is a sectional plan view illustrating a state in which the engaging hook 36 is inserted into the engaging hole 20, and FIG. 8B is a sectional plan view illustrating a state in which the attachment lever 38 is operated to fall from the state illustrated in FIG. 8A so that the engaging hook 36 is engaged with the engaging hole 20.

As illustrated in FIGS. 6 through 8B, the attachment part 32 includes the engaging hook 36, a base member 46 holding the engaging hook 36, and the attachment lever 38 for moving the base member 46 and the engaging hook 36. The engaging hook 36, the base member 46, and the attachment lever 38 are attached to the inside of the chassis 24 through a bracket 48 formed by bending a thin metal plate into a substantially U shape.

The engaging hook 36 projects from a long hole 24c formed in the side surface 24a of the chassis 24 and extending in the longitudinal direction of the side surface 24a, and has a nail 36a at the tip of the projection. A pressure-receiving part 36b that is pressed by a hook pressing part 38a of the attachment levers 38 projects from a side surface of the proximal end of the engaging hook 36. The engaging hook 36 is supported in such a manner that the proximal end is movable laterally (in a direction along the longitudinal direction of the side surface 24a) with respect to the base member 46. The engaging hook 36 is biased rearward (to the left in FIG. 8) so that the engaging hook 36 is disengaged from the engaging hole 20 by an unillustrated elastic member.

The base member 46 is supported to be movable in a front-rear direction (a direction approaching and away from the side surface 24a) in the bracket 48. The surface of the base member 46 opposite to the engaging hook 36 is biased by a coil spring 49 interposed between the surface and the bracket 48 in a direction in which the engaging hook 36 projects from the long hole 24c. A pair of slopes 46a and 46a to be pressed by a pair of base pressing parts 38b, 38b on the attachment lever 38 is provided at the left and right of the base member 46.

The attachment lever 38 is rotatably supported on the chassis 24 with left and right rotation shafts 50 interposed therebetween. The base pressing part 38b, the hook pressing part 38a, and the base pressing part 38b are axially aligned in a rotation proximal end portion of the attachment lever 38 provided with each of the rotation shafts 50.

Figure 9:
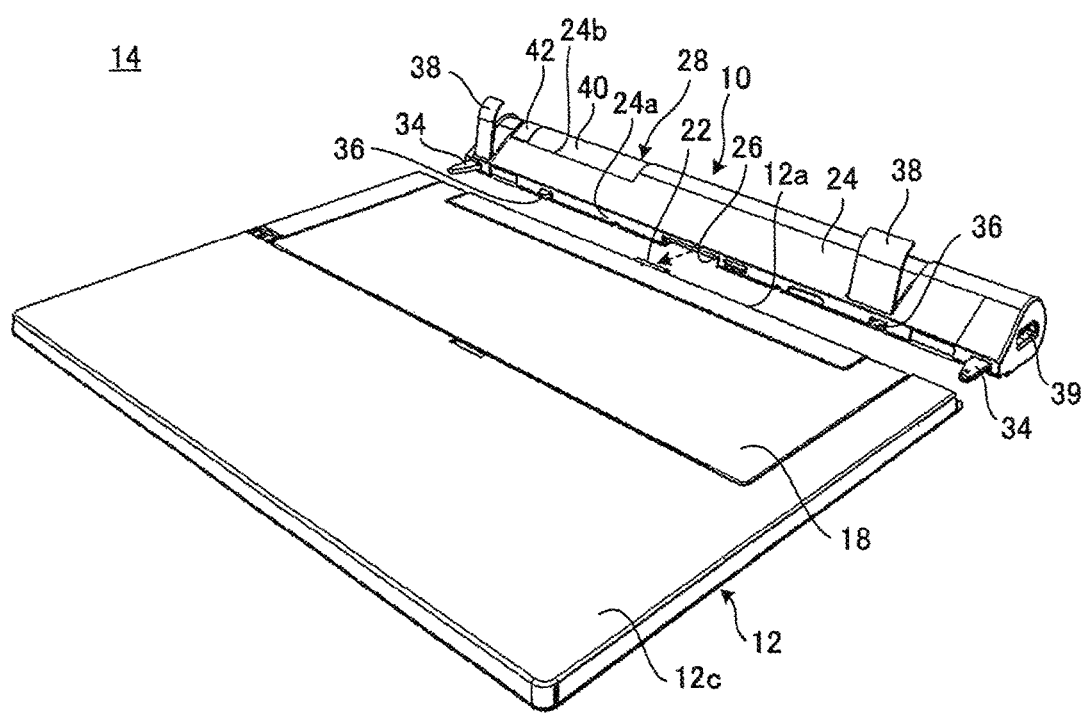
FIG. 9 is a disassembled perspective view illustrating a state immediately before the projector unit is attached to the tablet PC.
Figure 10:
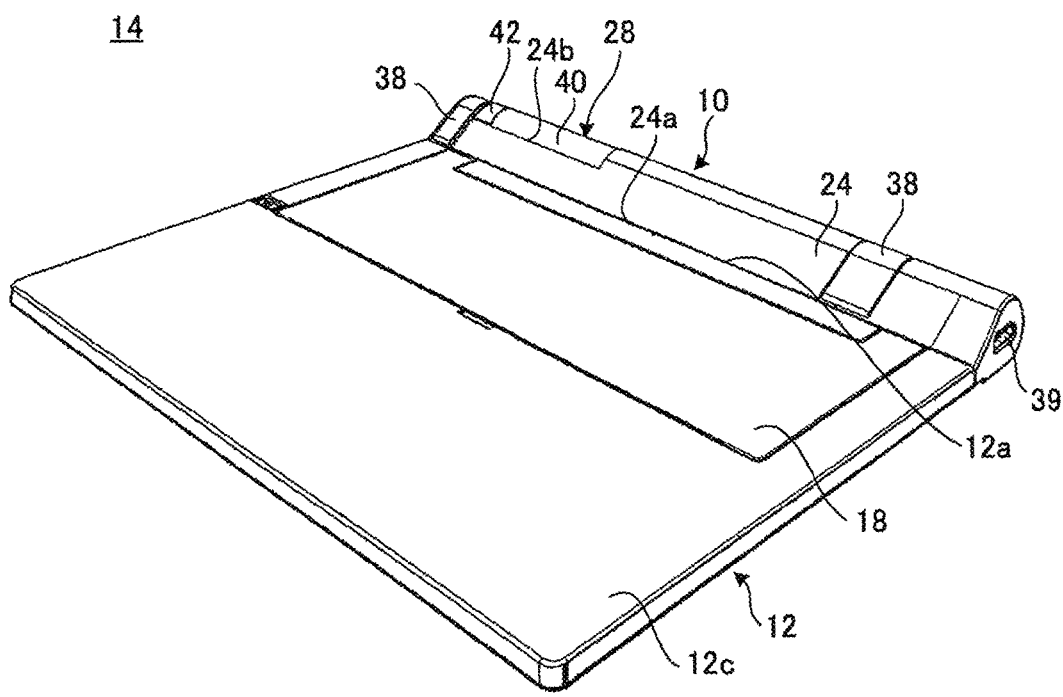
FIG. 10 is a perspective view illustrating a state in which the projector unit in the state illustrated in FIG. 9 is attached to the tablet PC.

FIG. 9 is a disassembled perspective view illustrating a state immediately before the projector unit 10 is attached to the tablet PC 12. FIG. 10 is a perspective view illustrating a state in which the projector unit 10 in the state illustrated in FIG. 9 is attached to the tablet PC 12.

First, attachment and detachment operations of the projector unit 10 to/from the tablet PC 12 will be generally described.

In attaching the projector unit 10 to the tablet PC 12, a plate part of each attachment lever 38 rises from the outer surface of the chassis 24 as illustrated in FIG. 9, and the engaging hooks 36 are set in predetermined engageable positions. In this state, as illustrated in FIGS. 6 and 8A, pressures from the hook pressing parts 38a and the base pressing parts 38b of the attachment levers 38 to the pressure-receiving parts 36b and the slopes 46a are canceled. Thus, in the attachment part 32, the base members 46 are at a forward position in which the engaging hooks 36 project from the long holes 24c by a biasing force of the coil springs 49, and at the same time, the engaging hooks 36 are at a rearward position under a biasing force of unillustrated elastic members.

Subsequently, the positioning projections 34 and the engaging hooks 36 constituting the attachment part 32 of the projector unit 10 are inserted into the positioning holes 19 and the engaging holes 20 constituting the attachment target part 16 of the tablet. PC 12, and the connection terminal part 26 is connected to the terminal 22.

Thereafter, as illustrated in FIG. 10, the plate parts of the attachment levers 38 are pushed to fall onto the outer surface of the chassis 24. Through the operation described above, as illustrated in FIGS. 7 and 8B, the slopes 46a are pressed by the base pressing parts 38b of the attachment levers 38 so that the base members 46 and the engaging hooks 36 supported by the base members 46 move rearward, and at the same time, the pressure-receiving parts 36b are pressed by the hook pressing parts 38a so that the engaging hooks 36 move in a direction in which the engaging hooks 36 are engaged with the engaging holes 20. In this manner, as illustrated in FIG. 8B, the nails 36a of the engaging hooks 36 are engaged with the engaging holes 20 so that the projector unit 10 is integrally attached to the tablet PC 12.

In view of this, when the stand 18 is pulled to adjust the rotation angle of the projector part 28, for example, as illustrated in FIGS. 1 and 2, projected light P from the projector lens 44 can be projected on the screen S at a desired projection angle.

It is possible to adjust the rotation position of the projector part 28 while the projector unit 10 is attached to the tablet PC 12. In this manner, the projection direction of projected light P from the projector lens 44 can be moved vertically or focusing on the screen S can be easily performed, so that high convenience and operability can be obtained. Since the projector unit 10 is attached to the side surface 12a of the tablet PC 12, it is possible to project light on the screen S while watching and operating the display 12b of the tablet PC 12. Thus, convenience and operability can be further enhanced. Furthermore, the projector unit 10 is configured to be removably attached to the side surface 12a of the tablet PC 12. Thus, the projector unit 10 can be detached when unnecessary so that the tablet PC 12 can be used alone. In another case, the projector unit 10 may always be attached to the tablet PC 12 so that the projector unit 10 can be carried together with the tablet PC 12.

In particular, in the electronic device 14, the tablet PC 12 includes the display 12b that is operable by touch, and the projector part 28 is configured to project a display content of the display 12b. Thus, while a user is watching and operating the display 12b, a similar video image can be projected from the projector unit 10 so that higher convenience and operability can be obtained.

In the projector unit 10, the projector lens 44 is configured to be housed in the chassis 24 by rotating the projector part 28 with respect to the chassis 24. In this manner, it is possible to prevent damage of the projector lens 44 in carrying or not using the projector unit 10 without a lens cover or the like.

In the projector unit 10, the chassis 24 has a rod shape extending along the side surface 12a of the tablet PC 12, the attachment part 32 is disposed on the side surface 24a of the chassis 24, and the rotatable projector part 28 is disposed on the side surface of the chassis 24 opposite to the side surface 24a on which the attachment part 32 is disposed. Thus, as illustrated in FIG. 2, the rotation angle of the projector part 28 can be smoothly adjusted while the projector unit 10 is attached to the tablet PC 12, and thus, high flexibility can be obtained in adjusting the projection position or focusing on the screen S, for example.

As has been described, the present invention provides a projector unit removably attached to a portable information device.

While the invention has been particularly shown and described with reference to a preferred embodiment, it will be understood by those skilled in the art that various changes in form and detail may be made therein without departing from the spirit and scope of the invention.

What is claimed is:

1. A projector unit comprising:
    a substantially cylindrical chassis having an attachment part removably attached to an attachment target part disposed on a first edge of a portable information device;
    a connection terminal part electrically connects to a terminal of said portable information device when said attachment part is physically attached to said attachment target part; and
    a projector part locates on a cylindrical surface of said substantially cylindrical chassis to allow a projection direction from a projector lens to be changeable, wherein said projector lens is to be housed in said chassis by rotating said projector part with respect to said chassis.

2. The projector unit of claim 1, wherein said chassis has a rod shape with a longitudinal axis extending along said first edge of said portable information device.

3. The projector unit of claim 1, wherein said attachment part is disposed on a surface of said chassis.

4. The projector unit of claim 1, wherein said projector part is disposed on a surface of said chassis opposite to the surface on which said attachment part is disposed.

5. The projector unit of claim 1, wherein, said chassis thither includes an adjustment button for adjusting a shape of a projected video image.

6. The projector unit of claim 1, wherein said chassis further includes a battery.

7. The projector unit of claim 6, wherein power consumption of said battery is reduced when said projector unit uses power from a power supply of said portable information device without using said battery even when said battery is provided.

8. A projector unit comprising:
    a substantially cylindrical chassis having an attachment part removably attached to an attachment target part disposed on a first edge of a portable information device;
    a connection terminal part electrically connects to a terminal of said portable information device when said attachment part is physically attached to said attachment target part; and
    a projector part locates on a cylindrical surface of said substantially cylindrical chassis to allow a projection direction from a projector lens to be changeable, wherein a rotation shaft of said projector part around which said projector part rotates with respect to said chassis extends along a longitudinal axis of said chassis along said first edge of said portable information device.

9. An electronic device comprising:
    a portable information device; and
    a projector unit removably attached to said portable information, device, wherein said projector unit includes
        a substantially cylindrical chassis having an attachment part removably attached to an attachment target part disposed on a first edge of said portable information device;
        a connection terminal part electrically connects to a terminal of said portable information device when said attachment part is physically attached to said attachment target part; and
        a projector part locates on a cylindrical surface of said substantially cylindrical chassis to allow a projection direction from a projector lens to be changeable, wherein said projector lens is to be housed in said chassis by rotating said projector part with respect to said chassis.

10. The electronic device of claim 9, herein said chassis has a rod shape with a longitudinal axis extending along said first edge of said portable information device.

11. The electronic device of claim 9, wherein said attachment part is disposed on a surface of said chassis.

12. The electronic device of claim 9, wherein said projector part is disposed on a surface of said chassis opposite to the surface on which said attachment part is disposed.

13. The electronic device of claim 9, wherein a rotation shaft of said projector part around which said projector part rotates with respect to said chassis extends along a longitudinal axis of said chassis along said first edge of said portable information device.

14. The electronic device of claim 9, wherein said chassis further includes a second edge shorter than said first edge.

15. The electronic device of claim 9, wherein said chassis further includes an adjustment button for adjusting a shape of a projected video image.

16. The electronic device of claim 9, wherein said chassis further includes a battery.

17. The electronic device of claim 16, wherein power consumption of said battery is reduced when said projector unit uses power from a power supply of said portable information device without using said battery even when said battery is provided.

18. The electronic device of claim 9, wherein said chassis further includes a second edge shorter than said first edge.

* * * * *